US009883140B2

(12) United States Patent
Johnson et al.

(10) Patent No.: US 9,883,140 B2
(45) Date of Patent: Jan. 30, 2018

(54) USING THE LOCATION OF A NEAR-END USER IN A VIDEO STREAM TO ADJUST AUDIO SETTINGS OF A FAR-END SYSTEM

(71) Applicant: Apple Inc., Cupertino, CA (US)

(72) Inventors: Martin E. Johnson, Los Gatos, CA (US); Tom-Davy William Jendrik Saux, Santa Clara, CA (US); Ronald N. Isaac, San Ramon, CA (US); Sylvain Choisel, San Francisco, CA (US); Afrooz Family, Emerald Hills, CA (US)

( * ) Notice: Subject to any disclaimer, the term of this patent is extended or adjusted under 35 U.S.C. 154(b) by 0 days.

(21) Appl. No.: 15/311,824

(22) PCT Filed: Sep. 26, 2014

(86) PCT No.: PCT/US2014/057814
§ 371 (c)(1),
(2) Date: Nov. 16, 2016

(87) PCT Pub. No.: WO2015/178949
PCT Pub. Date: Nov. 26, 2015

(65) Prior Publication Data
US 2017/0099458 A1    Apr. 6, 2017

Related U.S. Application Data

(60) Provisional application No. 62/000,314, filed on May 19, 2014.

(51) Int. Cl.
*H04N 7/15* (2006.01)
*H04S 7/00* (2006.01)
(Continued)

(52) U.S. Cl.
CPC ............... *H04N 7/15* (2013.01); *H04N 7/141* (2013.01); *H04R 3/12* (2013.01); *H04S 7/305* (2013.01);
(Continued)

(58) Field of Classification Search
None
See application file for complete search history.

(56) References Cited

U.S. PATENT DOCUMENTS

| | | | | |
|---|---|---|---|---|
| 5,548,346 A | * | 8/1996 | Mimura | H04N 5/147 348/14.1 |
| 5,745,161 A | * | 4/1998 | Ito | H04N 7/15 348/14.09 |

(Continued)

OTHER PUBLICATIONS

PCT International Search Report and Written Opinion for PCT International Appln No. PCT/US2014/057814 dated Jan. 21, 2015 (10 pages).

(Continued)

*Primary Examiner* — Creighton Smith
(74) *Attorney, Agent, or Firm* — Blakely Sokoloff Taylor & Zafman LLP

(57) ABSTRACT

A video conferencing system is described that includes a near-end and a far-end system. The near-end system records both audio and video of one or more users proximate to the near-end system. This recorded audio and video is transmitted to the far-end system through the data connection. The video stream and/or one or more settings of the recording camera are analyzed to determine the amount of a video frame occupied by the recorded user(s). The video conferencing system may directly analyze the video frames themselves and/or a zoom setting of the recording camera to determine a ratio or percentage of the video frame occupied by the recorded user(s). By analyzing video frames associated with an audio stream, the video conferencing system may drive a speaker array of the far-end system to more accurately reproduce sound content based on the position of the recorded user in a video frame.

24 Claims, 18 Drawing Sheets

(51) Int. Cl.
  *H04R 3/12* (2006.01)
  *H04N 7/14* (2006.01)
(52) U.S. Cl.
  CPC ...... *H04R 2430/01* (2013.01); *H04S 2400/13* (2013.01)

(56) References Cited

U.S. PATENT DOCUMENTS

| | | | |
|---|---|---|---|
| 6,624,841 B1* | 9/2003 | Buchner | H04N 7/142 348/14.01 |
| 6,894,714 B2* | 5/2005 | Gutta | H04N 7/15 348/14.05 |
| 6,930,702 B1* | 8/2005 | Ferren | H04M 3/567 348/14.08 |
| 2004/0257432 A1* | 12/2004 | Girish | H04N 7/142 348/14.08 |
| 2005/0081160 A1* | 4/2005 | Wee | G06Q 10/10 715/755 |
| 2010/0316232 A1* | 12/2010 | Acero | H04R 27/00 381/92 |
| 2011/0285809 A1* | 11/2011 | Feng | G06K 9/00234 348/14.16 |
| 2012/0069134 A1* | 3/2012 | Garcia, Jr. | H04M 3/568 348/14.08 |
| 2013/0016842 A1* | 1/2013 | Schultz-Amling | G10L 19/173 381/17 |

OTHER PUBLICATIONS

PCT International Preliminary Report on Patentability for PCT International Appln No. PCT/US2014/057814 dated Dec. 1, 2016 (8 pages).

* cited by examiner

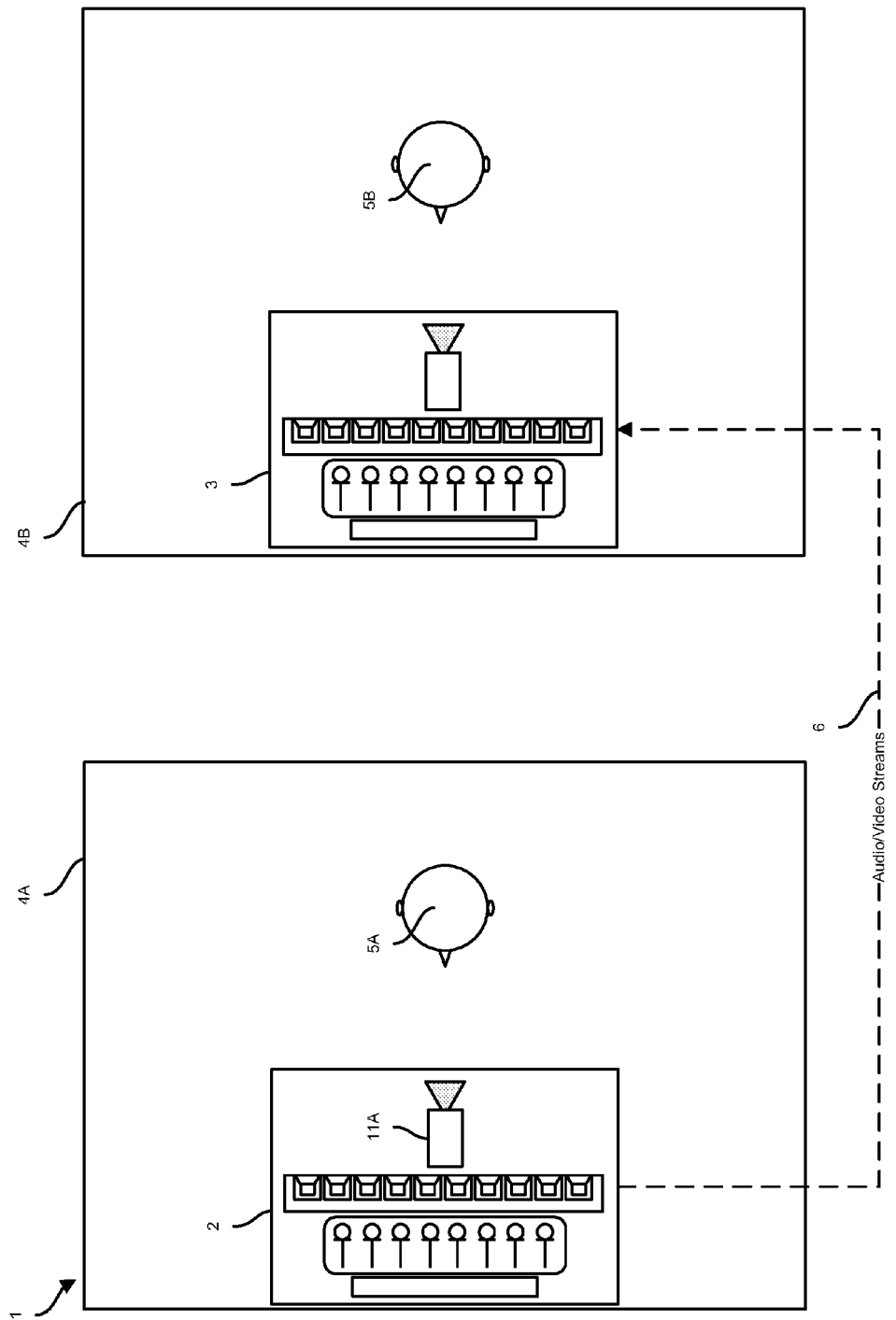

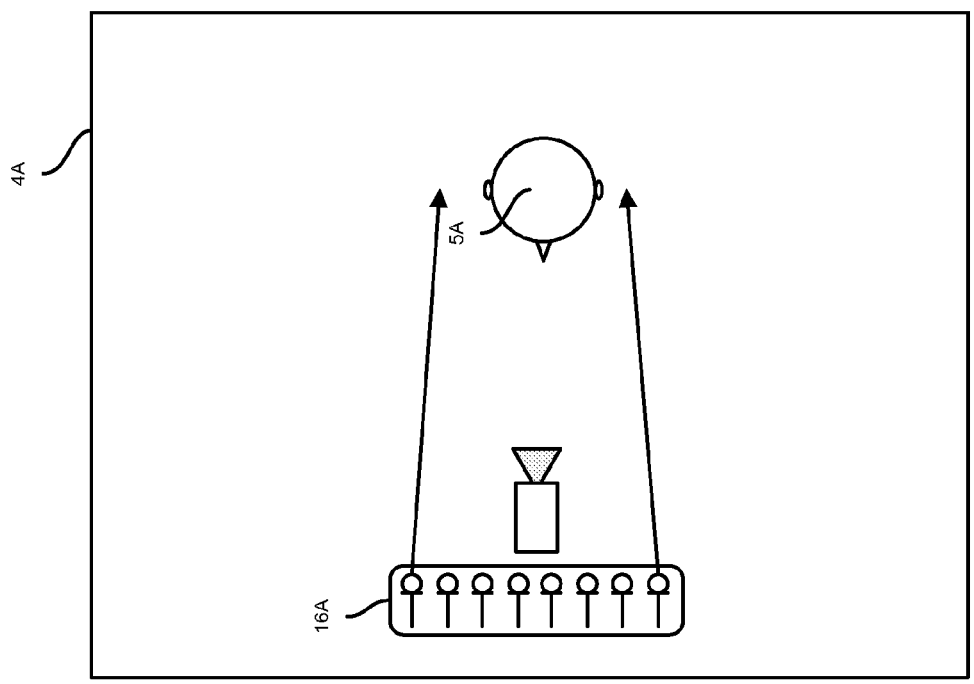

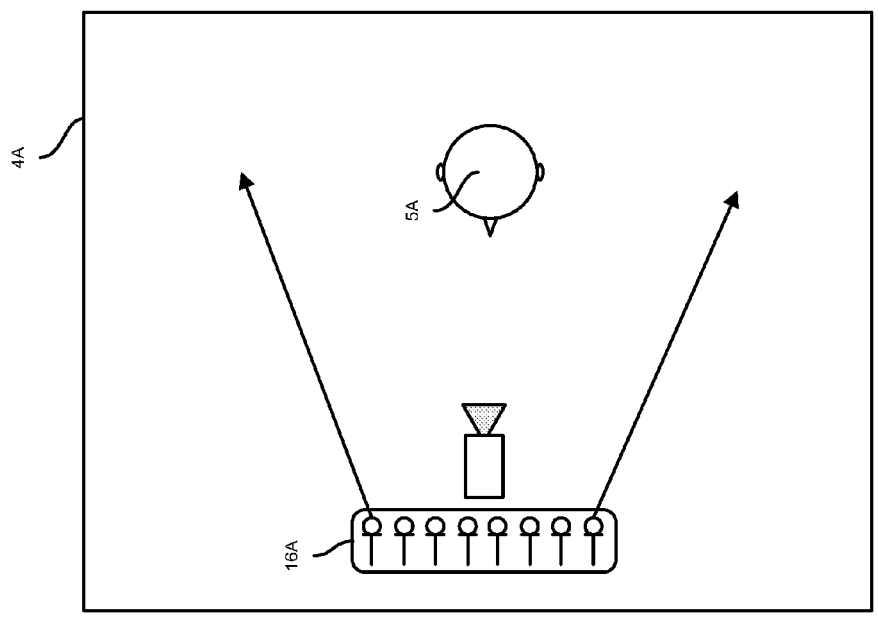

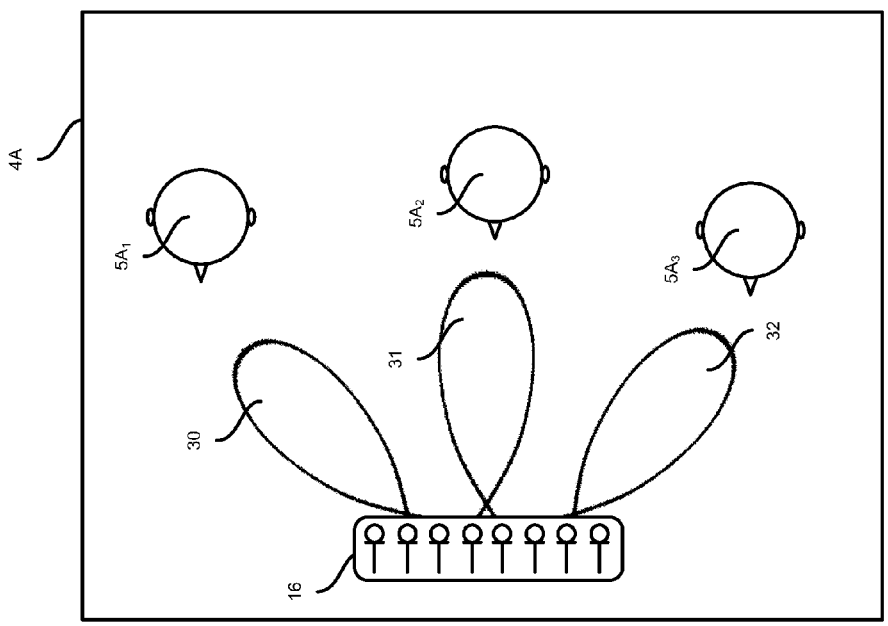

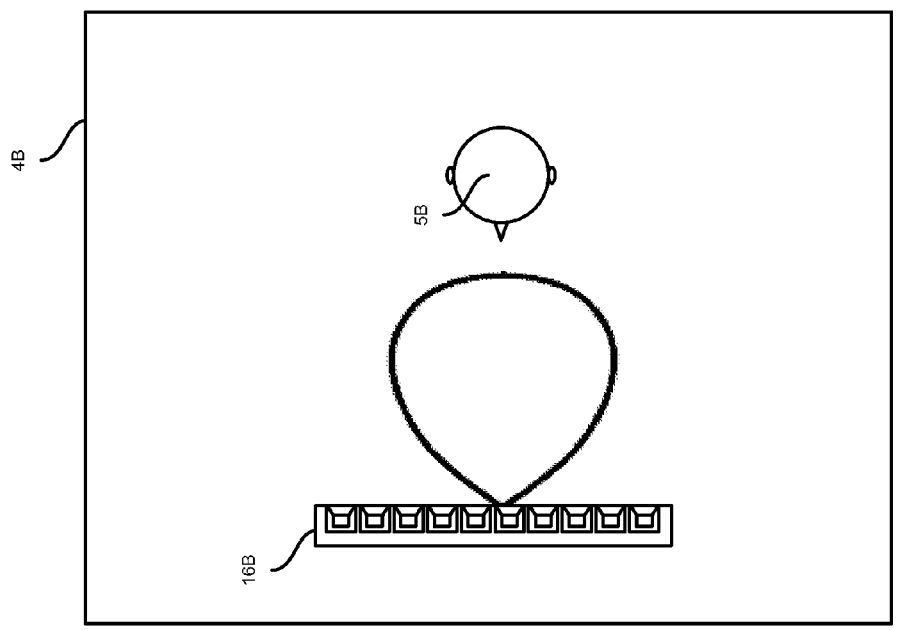

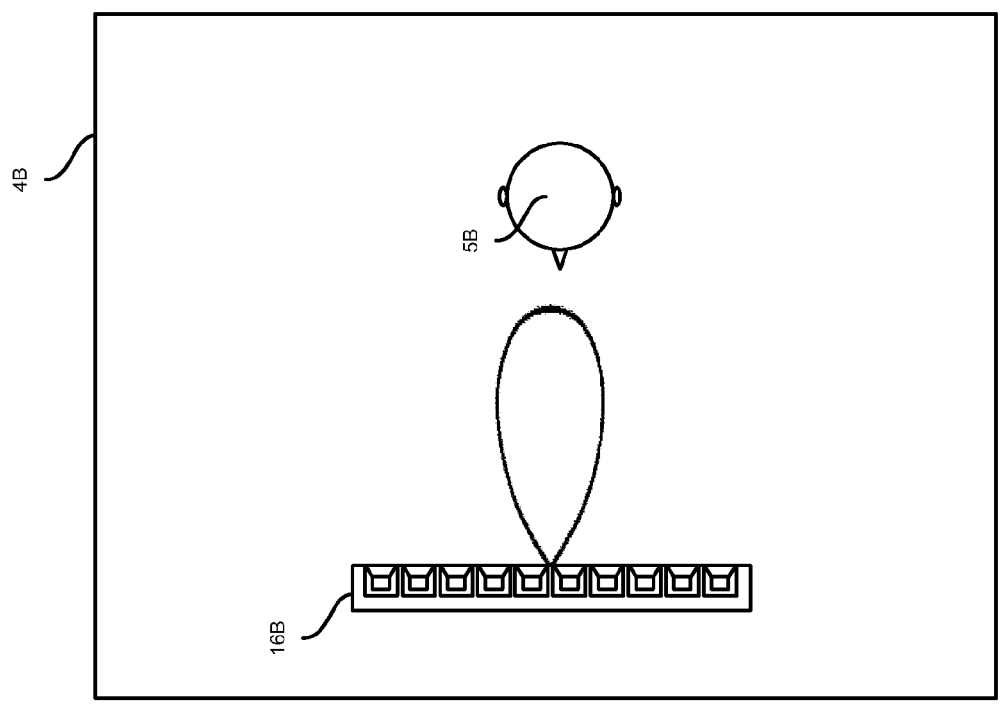

USING THE LOCATION OF A NEAR-END USER IN A VIDEO STREAM TO ADJUST AUDIO SETTINGS OF A FAR-END SYSTEM

RELATED MATTERS

This application is a U.S. National Phase Application under 35 U.S.C. § 371 of International Application No. PCT/US2014/057814, filed Sep. 26, 2014, which claims the benefit of the earlier filing date of U.S. provisional application No. 62/000,314, filed May 19, 2014.

FIELD

A far-end audio device that adjusts audio output based on the location of a near-end user captured in a video stream is described. Other embodiments are also described.

BACKGROUND

Two way communications may be performed between two or more computing devices. For example, a near-end computing device may conduct a video conference with a far-end computing device over a wired or wireless medium. The video conference session captures both the audio and video of a user situated in the vicinity of the near-end computing device and transmits the audio and video over the medium to the far-end computing device. The far-end computing device may display the video through a monitor and output the audio through one or more speakers.

SUMMARY

In one embodiment, a video conferencing system includes a near-end system and a far-end system that communicate over a data connection. The near-end system records both audio and video of one or more users proximate to the near-end system. This recorded audio and video is transmitted to the far-end system through the data connection. In one embodiment, the video stream and/or one or more settings of the recording camera are analyzed to determine the amount of a video frame occupied by the recorded user(s). For example, the video conferencing system may directly analyze video frames themselves and/or a zoom setting of the recording camera to determine a ratio or percentage of the video frames occupied by the recorded user(s).

By analyzing video frames associated with an audio stream or other settings associated with the video recording, the video conferencing system may drive a speaker array of the far-end system to more accurately reproduce sound content based on the position of the recorded user in a video frame. In particular, the adjusted audio imitates the intimacy or social characteristics of the recorded user's speech. In one embodiment, the audio adjustments may be made relative to 1) loudness, 2) directivity, 3) reverberation, and/or 4) equalization of output audio/sound. For example, the audio may be adjusted to reproduce the reverberant effects of a room when the recorded user occupies a relatively small amount of a video frame while these room effects are lessened or eliminated when the recorded user occupies a large amount of the video frame.

These adjustments may be reflected in target audio parameters generated by the near-end system or the far-end system. In one embodiment, intermediate audio parameters may also be generated to create a smooth transition between the current audio parameters and the target audio parameters.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

FIG. 1 shows a video conference system that transfers audio and video streams captured by a near-end computing system to a far-end computing system according to one embodiment of the invention.

FIG. 3A shows a microphone array in the near-end system with a narrow beam pattern according to one embodiment of the invention.

FIG. 3B shows a microphone array in the near-end system with a wide beam pattern according to one embodiment of the invention.

FIG. 6B shows three beam patterns generated by a microphone array for capturing sound from multiple users according to one embodiment of the invention.

FIG. 9A shows a first directivity pattern during a transition to a target directivity pattern according to one embodiment of the invention.

FIG. 9C shows a third directivity pattern during a transition to a target directivity pattern according to one embodiment of the invention.

DETAILED DESCRIPTION

Several embodiments are described with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

FIG. 1 shows a video conference system 1 that transfers audio and video streams captured by a near-end computing system 2 to a far-end computing system 3. Although shown and described as transferring audio and video from the near-end computing system 2 to the far-end computing system 3, in other embodiments the far-end system 3 may synchronously or asynchronously transfer captured audio and video to the near-end system 2. Each element of the video conference system 1 will be described by way of example below. In some embodiments, the video conference system 1 may include more elements than those shown and described.

The near-end system 2 may be located at a first location 4A and the far-end system 3 may be located at a second location 4B. For example, the first location 4A may be the house of user 5A and the second location 4B may be the house of user 5B. The first and second locations 4A and 4B may be separated by any distance (e.g., 500 feet or 500 miles) and the near-end system 2 may communicate with the far-end system 3 using a data connection 6. The data connection 6 may be any combination of wired and wireless mediums operating in a distributed or a point-to-point network. For example, the data connection 6 may utilize a combination of wired and wireless protocols and standards, including the IEEE 802.11 suite of standards, IEEE 802.3, cellular Global System for Mobile Communications (GSM), cellular Code Division Multiple Access (CDMA), or Long Term Evolution (LTE), and/or Bluetooth.

Figure 2A:
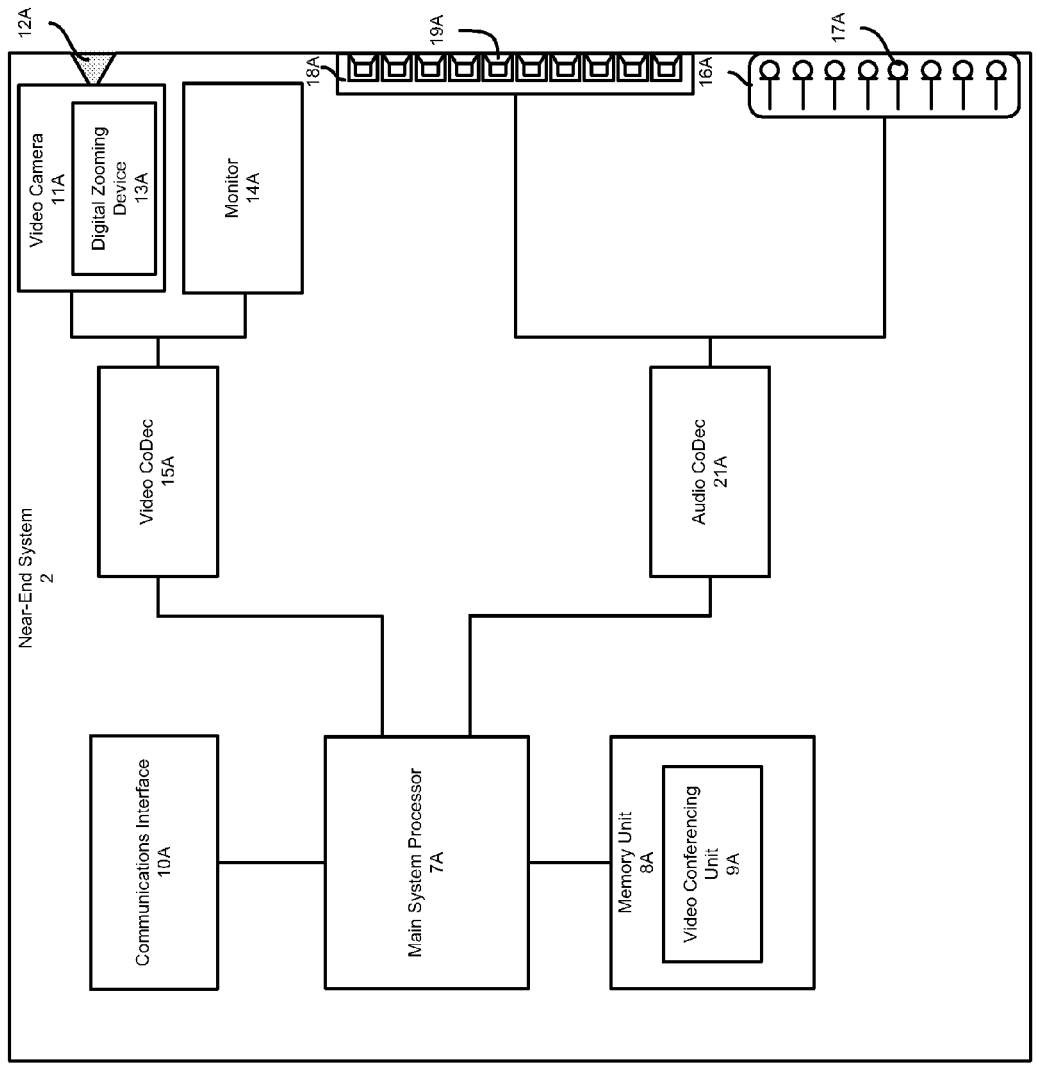
FIG. 2A shows a component diagram of the near-end system according to one embodiment of the invention.

FIG. 2A shows a component diagram of the near-end system 2 according to one embodiment. The near-end system 2 may be any computing system that is capable of performing video conferencing operations to transmit captured audio and video data to the far-end system 3 over the data connection 6. For example, the near-end system 2 may be a laptop computer, a desktop computer, a tablet computer, a video conferencing phone, and/or a mobile device (e.g., cellular telephone or mobile media player). In some embodiments, the near-end system 2 may also receive audio and video data from the far-end system 3 over the data connection 6. Each element of the near-end system 2 shown in FIG. 2A will now be described.

The near-end system 2 may include a main system processor 7A and a memory unit 8A. The processor 7A and memory unit 8A are generically used here to refer to any suitable combination of programmable data processing components and data storage that conduct the operations needed to implement the various functions and operations of the near-end system 2. The processor 7A may be a special purpose processor such as an application-specific integrated circuit (ASIC), a general purpose microprocessor, a field-programmable gate array (FPGA), a digital signal controller, or a set of hardware logic structures (e.g., filters, arithmetic logic units, and dedicated state machines) while the memory unit 8A may refer to microelectronic, non-volatile random access memory. An operating system may be stored in the memory unit 8A, along with application programs specific to the various functions of the near-end system 2, which are to be run or executed by the processor 7A to perform the various functions of the near-end system 2. For example, the memory unit 8A may include a video conferencing unit 9A, which in conjunction with other hardware and software elements of the near-end system 2, provides video conferencing functionality to the near-end user 5A as will be described in further detail below.

In one embodiment, the near-end system 2 may include a communications interface 10A for communicating with the far-end system 3 and/or other components over one or more connection (e.g., the data connection 6) as will be described in further detail below. For example, the communications interface 10A may be capable of communicating using Bluetooth, the IEEE 802.11x suite of standards, IEEE 802.3, cellular Global System for Mobile Communications (GSM), cellular Code Division Multiple Access (CDMA), and/or Long Term Evolution (LTE). In one embodiment, the communications interface 10A facilitates the transmission/reception of video, audio, and metadata to/from the far-end system 3.

The near-end system 2 may include a video camera 11A to capture scenes proximate to the near-end system 2 (e.g., in the first location 4A). The video camera 11A may be any type of video capture device, including units that use charge-couple device (CCD) and/or complementary metal-oxide-semiconductor (CMOS) active pixel sensors. As shown in FIG. 1, the video camera 11A may capture the near-end user 5A that is located in or proximate to the first location 4A. Although described and shown in FIG. 1 as a single near-end user 5A, in other embodiments multiple near-end users 5A may be captured by the video camera 11A.

In one embodiment, the video camera 11A may be capable of zooming in on a particular area within the first location 4A. For example, the video camera 11A may be equipped with a zoom lens 12A, which is a mechanical assembly of lens elements for which the focal length (and thus angle of view) can be varied. Alternatively or in addition to a mechanical zoom lens 12A, the video camera 11A may be equipped with a digital zooming device 13A, which decreases (narrows) the apparent angle of view of video captured by the video camera 11A by cropping the video to be centered on a desired segment of the captured video image. Through interpolation, this digital cropping generates a processed video image with the same aspect ratio as the original video.

In one embodiment, zooming using either the zoom lens 12A or the digital zooming device 13A may be accomplished through manual input by the near-end user 5A, the far-end user 5B, another human operator, and/or through an automatic zooming mechanism. For example, in one embodiment, the video camera 11A may zoom in on a speaking individual (e.g., the user 5A) without input by a human operator (e.g., the users 5A or 5B).

In one embodiment, the near-end system 2 may include a monitor 14A for displaying video captured by the far-end system 3, the near-end system 2, and/or a user interface for the near end-user 5A. The monitor 14A may utilize any display technology, including a liquid crystal display (LCD) panel, a plasma display panel, and/or an organic light emitting diode (OLED) display panel.

In one embodiment, the near-end system 2 may include a video codec 15A for processing video signals. For example, the video codec 15A may process video signals received from the video camera 11A and video signals received over the data connection 6 from the far-end system 3 such that these video signals may be displayed on the monitor 14A. The processing may include antialiasing, up-conversion, down-conversion, de-noising, and/or digital cropping/zooming.

In one embodiment, the near-end system 2 may include a microphone array 16A. The microphone array 16A may be composed of two or more microphones 17A that sense sounds and convert these sensed sounds into electrical signals. The microphones 17A may be any type of acoustic-to-electric transducer or sensor, including a MicroElectrical-Mechanical System (MEMS) microphone, a piezoelectric microphone, an electret condenser microphone, or a dynamic microphone. The microphones 17A in the microphone array 16A may utilize various weights and delays to provide a range of polar patterns, such as cardioid, omnidirectional, and figure-eight. The generated polar patterns alter the direction and area of sound captured in the vicinity of the first location 4A. In one embodiment, the polar patterns of the microphones 17A may vary continuously over time. As shown in FIG. 3A and described in further detail below, the microphone array 16A may utilize a narrowly focused beam pattern or as shown in FIG. 3B, the microphone array 16A may utilize a wide beam pattern. In one embodiment, the microphones 17A within the microphone array 16A may be used to capture separate areas of the first location 4A. In this embodiment, separate channels or audio streams may be generated for each separately monitored area of the first location 4A by the microphones 17A. One or more of these channels may be used by the far-end system 3 to reproduce direct and reverberant sounds detected at the first location 4A.

In one embodiment, the near-end system 2 may include a speaker array 18A for outputting audio received from the far-end system 3. As shown in FIG. 2A, the speaker array 18A may include multiple transducers 19A housed in a single cabinet. In this example, the speaker array 18A has ten distinct transducers 19A evenly aligned in a row within a cabinet. In other embodiments, different numbers of transducers 19A may be used with uniform or non-uniform spacing and alignment. Although shown as aligned is a flat plane or straight line, the transducers 19A may be aligned in a curved fashion along an arc.

The transducers 19A may be any combination of full-range drivers, mid-range drivers, subwoofers, woofers, and tweeters. Each of the transducers 19A may use a lightweight diaphragm, or cone, connected to a rigid basket, or frame, via a flexible suspension that constrains a coil of wire (e.g., a voice coil) to move axially through a cylindrical magnetic gap. When an electrical audio signal is applied to the voice coil, a magnetic field is created by the electric current in the voice coil, making it a variable electromagnet. The coil and the transducers' 19A magnetic system interact, generating a mechanical force that causes the coil (and thus, the attached cone) to move back and forth, thereby reproducing sound under the control of the applied electrical audio signal coming from a source (e.g., the main system processor 7A and the far-end system 3).

Each transducer 19A may be individually and separately driven to produce sound in response to separate and discrete audio signals. By allowing the transducers 19A in the speaker array 18A to be individually and separately driven according to different parameters and settings (including delays and energy levels), the speaker array 18A may produce numerous directivity patterns to simulate or better represent respective channels of sound program content played to the near-end user 5A. For example, beam patterns of different widths and directivities may be emitted by the speaker array 18A in the first location 4A.

Although shown as including one speaker array 18A, the near-end system 2 may include any number of speaker arrays 18A. Hereinafter, the near-end system 2 will be described as including a single speaker array 18A; however, as described above, it is understood that the near-end system 2 may operate in a similar fashion with multiple speaker arrays 18A.

Further, although shown as integrated within the same casing as other components of the near-end system 2, in some embodiments one or more of the video camera 11A, the microphone array 16A, and the speaker array 18A may be separate and coupled to the other components of the near-end system 2 through wired or wireless mediums. For example, one or more of the video camera 11A, the microphone array 16A, and the speaker array 18A may be coupled to other components of the near-end system 2 through the communications interface 10A. In this embodiment, the communications interface 10A may be capable of transmitting signals using the Bluetooth suite of protocols or another short/near range wireless standard.

In one embodiment, the near-end system 2 may include an audio codec 21A for managing digital and analog audio signals. For example, the audio codec 21A may manage input audio signals received from the one or more microphones 17A in the microphone array 16A coupled to the audio codec 21A. Management of audio signals received from the microphones 17A may include analog-to-digital conversion, echo cancellation, and general signal processing. Similarly, the audio codec 21A may manage audio signals for driving each transducer 19A in the speaker array 18A.

Figure 2B:
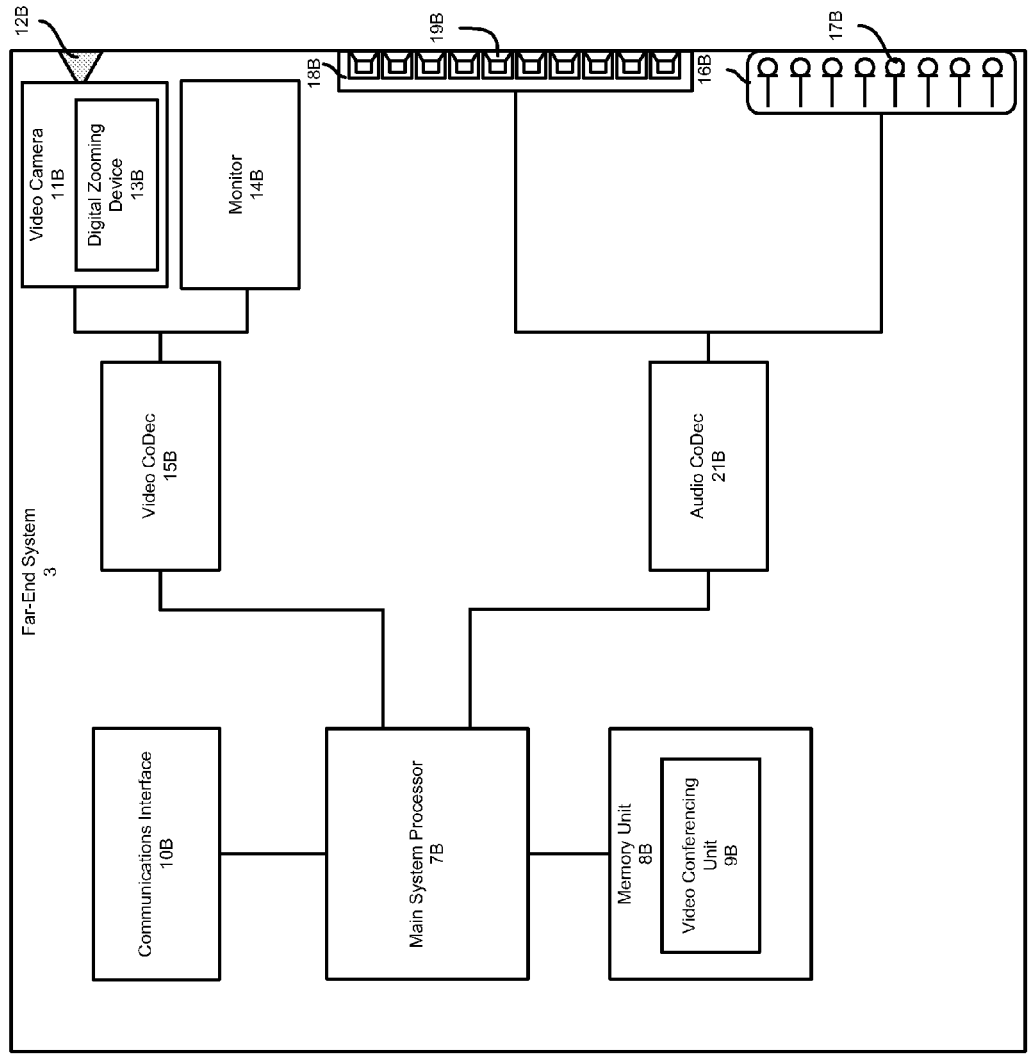
FIG. 2B shows a component diagram of the far-end system according to one embodiment of the invention.

In one embodiment, the far-end system 3 may be identical and/or similar to the near-end system 2 described above in relation to FIG. 2A. For example, FIG. 2B shows a component diagram of the far-end system 3 according to one embodiment. In one embodiment, each of the elements shown in FIG. 2B may operate in a similar fashion as corresponding elements shown in FIG. 2A.

As noted above, the memory unit 8A may store a video conferencing unit 9A, which provides video conferencing functionality to the near-end user 5A. In one embodiment, the video conferencing unit 9A may communicate with a corresponding video conferencing unit 9B in the far-end system 3 such that a video conference call may be conducted between the user 5A and the user 5B. Although described as conducted between a single pair of near-end and far-end users 5A and 5B, as will be readily apparent from the description below, the video conferencing units 9A and 9B may facilitate a conference call between one or more near end users 5A and one or more far-end users 5B.

Figure 4:
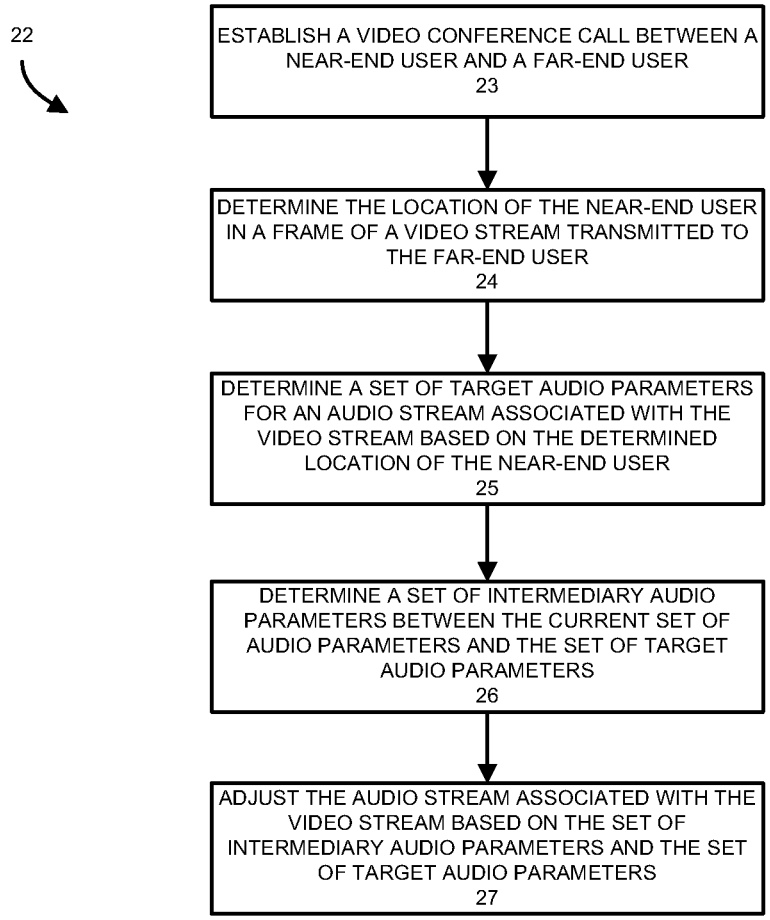
FIG. 4 shows a method for adjusting sound according to one embodiment of the invention.

FIG. 4 shows a method 22 for adjusting sound according to one embodiment of the invention. The method 22 may be performed by one or more components of the near-end system 2 and/or the far-end system 3. Each operation of the method 22 will be described by way of example below.

The method 22 may commence at operation 23 with the start of a video conference call between the near-end system 2 and the far-end system 3. The video conference call may be instigated by the near-end user 5A, the far-end user 5B, or another entity. For example, the video conference call may be instigated by the near-end user 5A after entering the number, screen name, or another identifier in a graphical user interface associated with the video conferencing unit 9A.

Figure 5A:
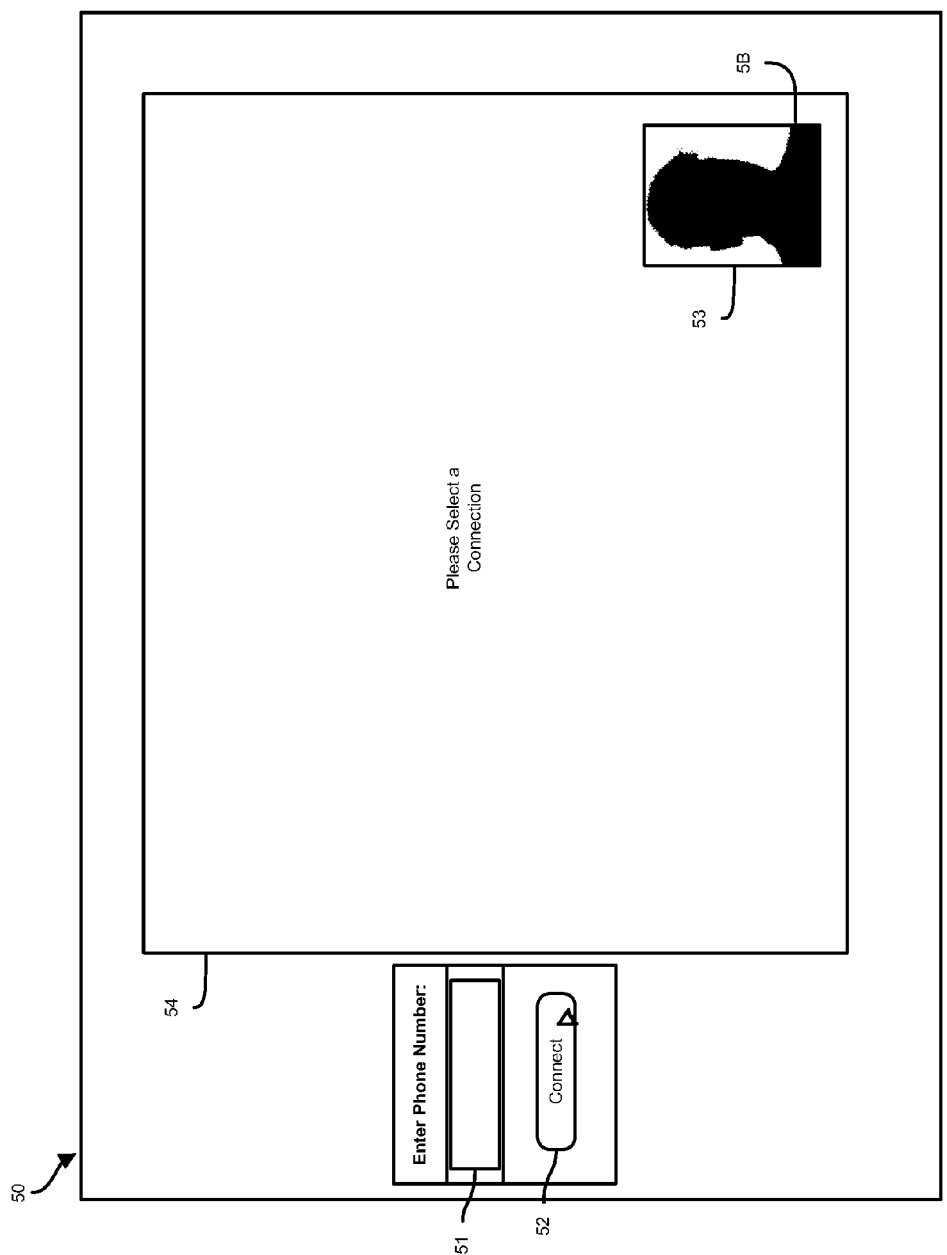
FIG. 5A shows an example user interface prior to the establishment of a video conference call according to one embodiment of the invention.
Figure 5B:
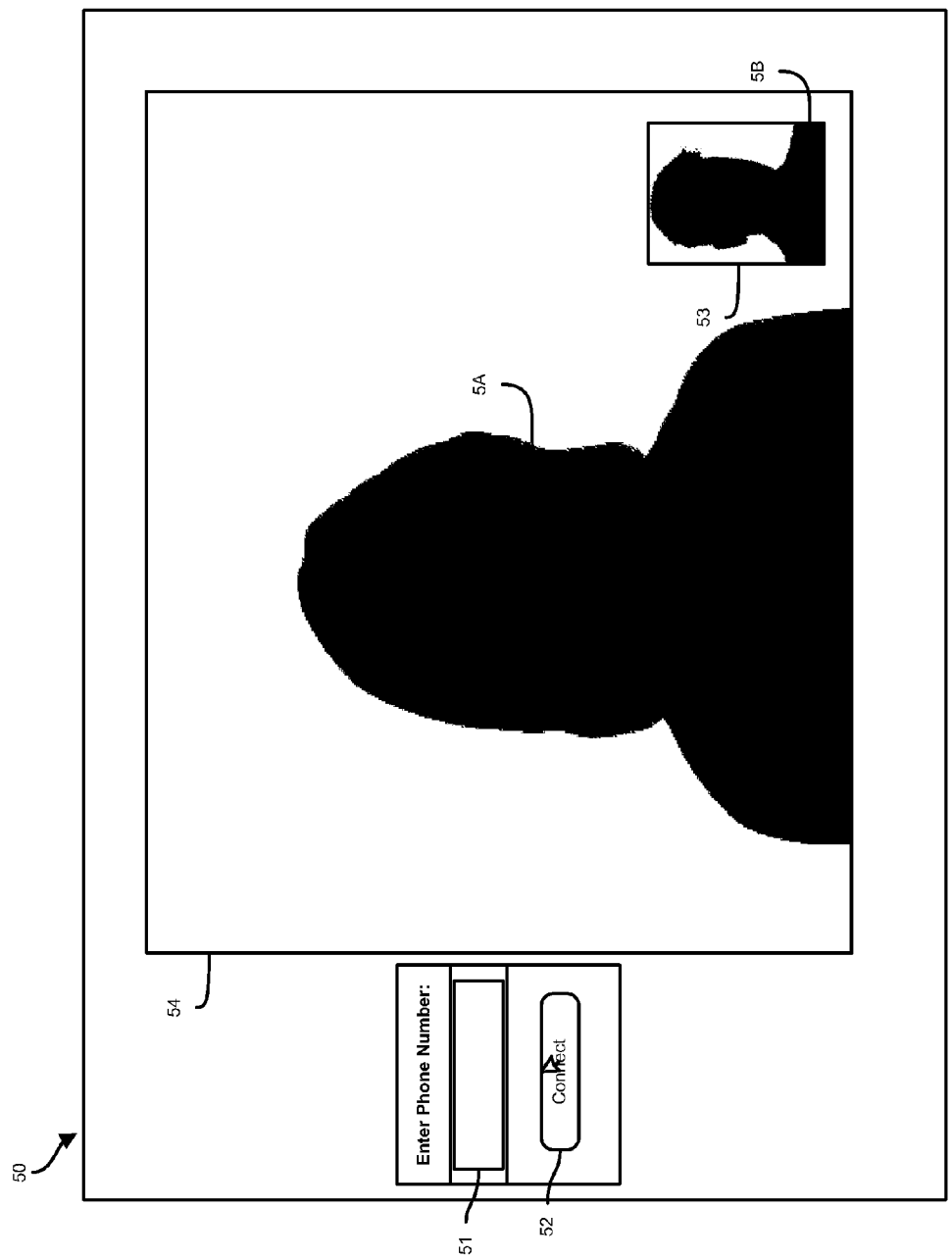
FIG. 5B shows an example user interface after the establishment of a video conference call according to one embodiment of the invention.

FIG. 5A shows an example user interface 50, as would be viewed by the far-end user 5B, for establishing a video conference call between the near-end user 5A and the far-end user 5B. In the example user interface 50, the far-end user 5B is presented with a phone number entry field 51, a connect button 52, a near-end view 53, and a far-end view 54. The near-end view 53 shows the second location 4B as captured by the video camera 11B within the far-end system 3. As shown, this near-end view 53 includes a view of the user 5B since the user 5B is in the line of view of the video camera 11B. The far-end view 54 shows the first location 4A as captured by the video camera 11A within the system 3 when a video conference session is active. Since in FIG. 5A a video conference call has not yet been established with the system 2, the far-end view 54 is inactive. FIG. 5B shows the user interface 50 upon establishing a video conference between the system 2 associated with the user 5A and the system 3 associated with the user 5B. As shown, the far-end view 54 now displays a view of the first location 4A, including a close-up shot of the near-end user 5A, as captured by the video camera 11A in the system 2.

As noted above, the user 5B may establish a connection with the user 5A by entering a phone number of the user 5A in the phone number entry field 51 and clicking the connect button 52. In other embodiments, a user name or a different identifier of the user 5A may be selected in place of a phone number to establish a video conference call between the user 5A and the user 5B.

In one embodiment, establishment of a video conference call between the system 2 and the system 3 includes the continual transmission from the system 2 to the system 3 of a stream of audio captured by the microphones 17A in the microphone array 16A in the first location 4A in addition to a video stream captured by the video camera 11A in the first location 4A. Accordingly, the audio and video streams transferred to the system 3 may represent audio and video of the user 5A, since the user 5A is located within the first location 4A. These audio and video streams may be transmitted concurrently to the system 3 over the data connection 6.

Figure 6A:
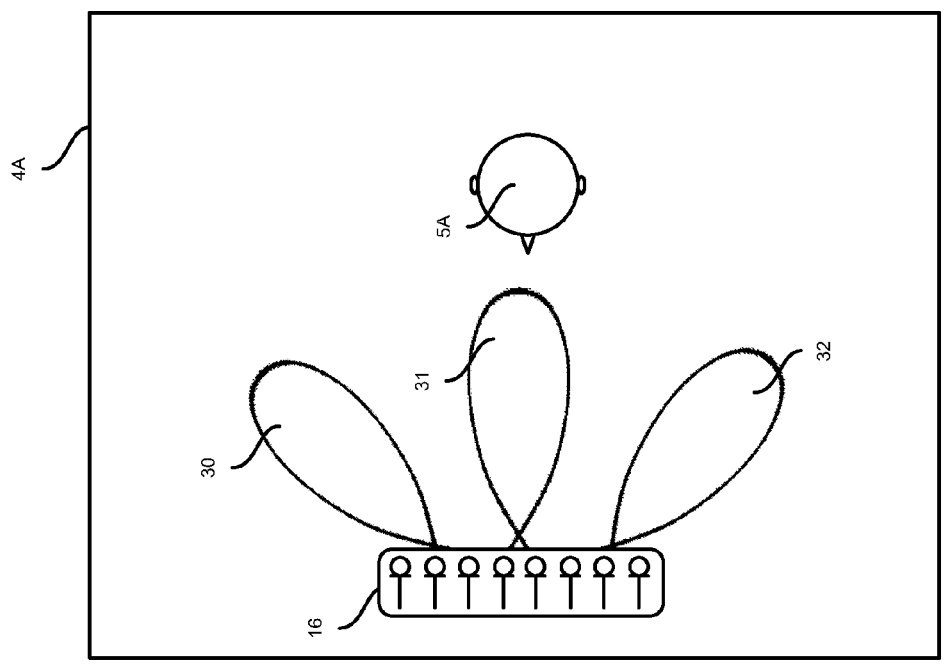
FIG. 6A shows three beam patterns generated by a microphone array for capturing direct and reverberant sounds according to one embodiment of the invention.

As noted above, the microphones 17A in the microphone array 16A may generate separate beam patterns. The separate beam patterns may capture audio in separate areas of the first location 4A. For example, as shown in FIG. 6A the microphone array 16A may generate a left beam pattern 30 corresponding to a left area in the first location 4A, a center beam pattern 31 corresponding to a center area in the first location 4A, and a right beam pattern 32 corresponding to a right area of the first location 4A. These separate beam patterns may be used to capture reverberant sound in the first location 4A (e.g., the left and right beam patterns 30 and 32) along with direct sound (e.g., the center beam pattern 31). In another embodiment, the separate beam patterns may be used to separately capture sound from multiple users 5A. For example, as shown in FIG. 6B, the left, center, and right beam patterns 30, 31, and 32 generated by the microphone array 16A are used to capture sound from the users $5A_1$, $5A_2$, and $5A_3$, respectively.

Figure 6C:
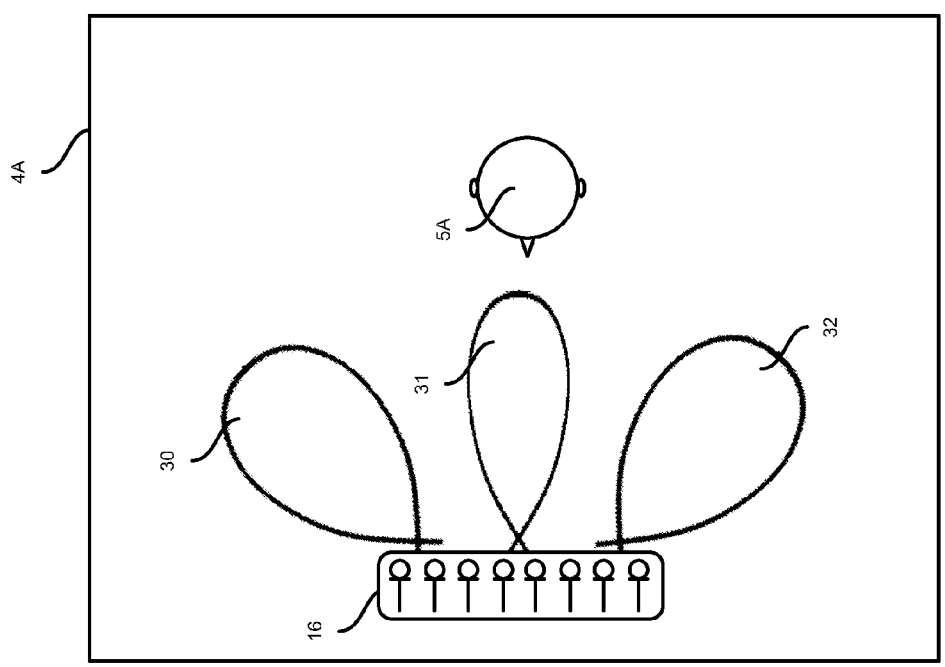
FIG. 6C shows three beam patterns generated by a microphone array for capturing direct and reverberant sounds after the widths of two of the beam patterns were increased according to one embodiment of the invention.

In one embodiment, the microphone array 16A may vary one or more beam patterns to more effectively capture reverberant and direct sounds in the first location 4A. The changes may include adjustment of the widths and/or directions of beam patterns associated with the microphone array 16A. For example, as shown in FIG. 6C, the widths of the beam patterns 30 and 32 were expanded in comparison to the beam patterns 30 and 32 in FIG. 6A. This adjustment may provide a more accurate capture of reverberant sounds in the first location 4A based on changing conditions. In some embodiments, adjustment of beam patterns for the microphone array 16A may include variance in the number of separate beams used to capture sound in the first location 4A.

Figure 7A:
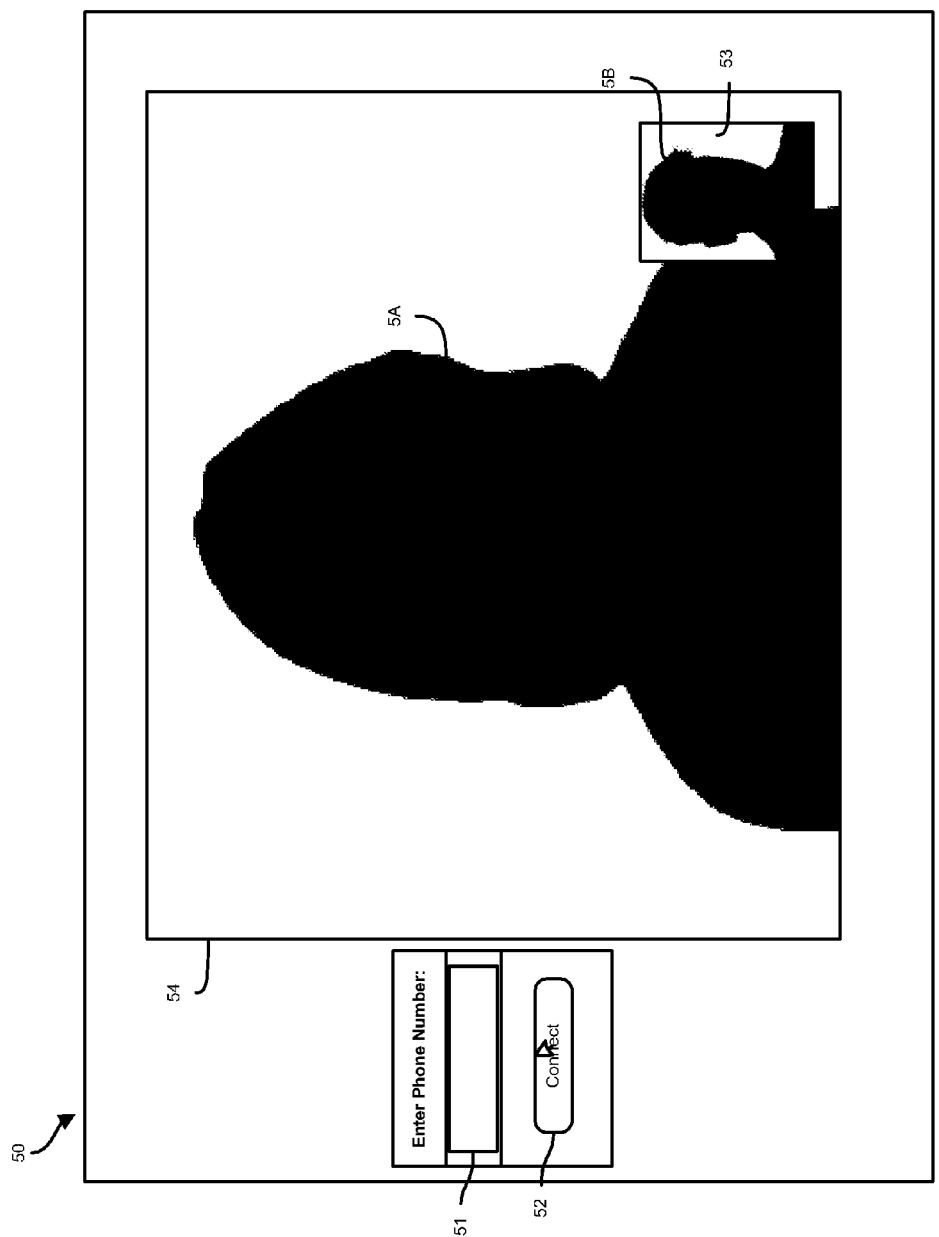
FIG. 7A shows an example user interface in which a user is occupying a large amount of a video frame for a video conference call according to one embodiment of the invention.
Figure 7B:
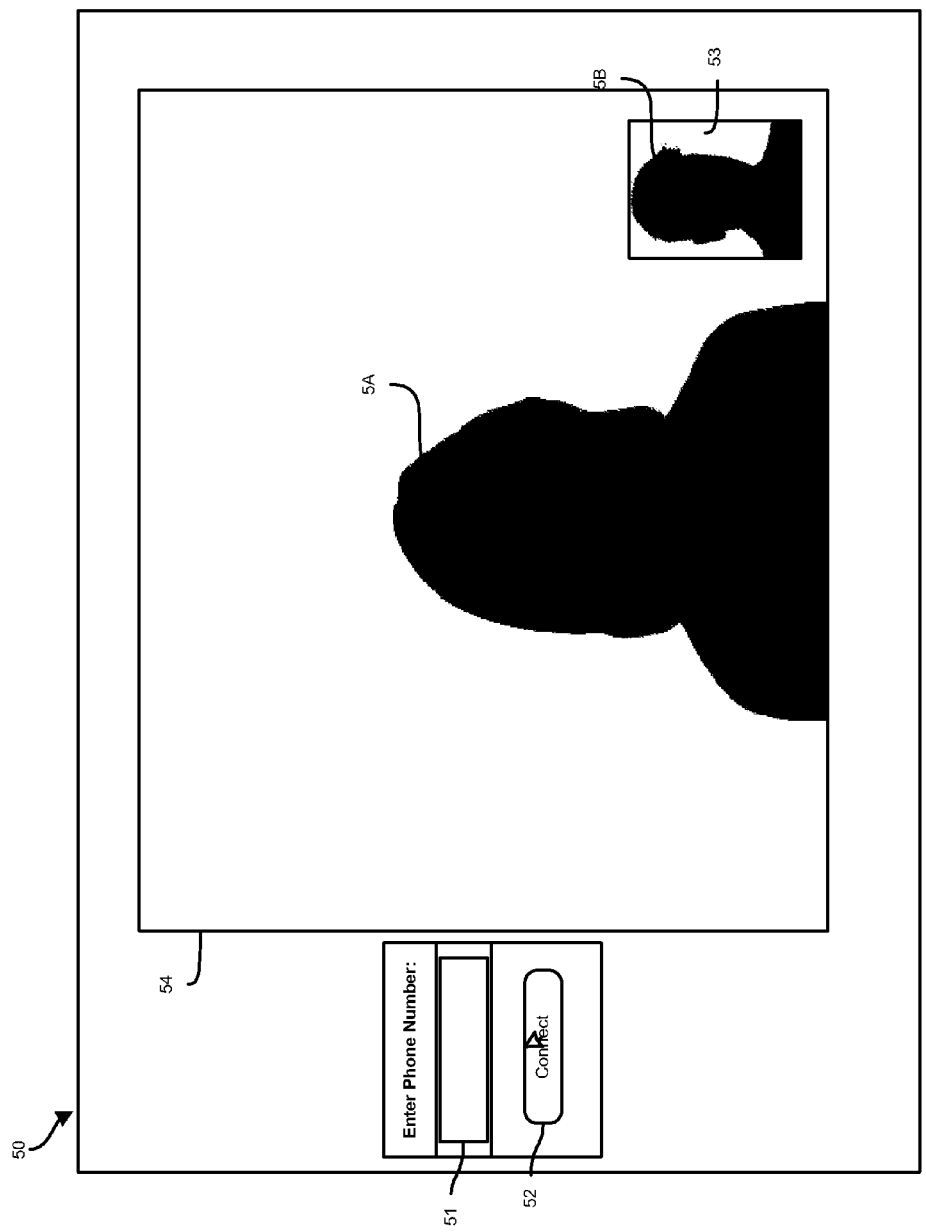
FIG. 7B shows an example user interface in which a user is occupying a small amount of a video frame for a video conference call according to one embodiment of the invention.

Following the commencement of a conference call at operation 23, operation 24 determines the amount of a video frame in the video stream transmitted from the system 2 to the system 3 occupied by the user 5A. For example, as shown in FIG. 7A the user 5A occupies a large portion of the video frame presented in the far-end view 54. This large ratio of the video frame occupied by the user 5A may indicate that the user 5A is attempting to speak in an intimate and direct fashion to the user 5B. In contrast, in FIG. 7B the user 5A occupies a smaller amount of the video frame. This small ratio of the video frame occupied by the user 5A may indicate that the user 5A is attempting to speak in a non-intimate or "social" fashion to the user 5B.

Determining the amount of space occupied by the user 5A in a video frame of the video stream may be determined or estimated using various techniques. In one embodiment, operation 24 may gauge the ratio of the user 5A in the video frame based on a zoom setting of the video camera 11A in the near-end system 2. The zoom setting may be either from the digital zooming device 13A or the mechanical zoom lens 12A. In this embodiment, a high zoom value (e.g., 5×+) may indicate that the user 5A is positioned to occupy a large portion of the video frame (e.g., a close-up shot). In contrast, a low zoom value (e.g., 2×) or no zoom value (e.g., 1×) would indicate that the user 5A is positioned to occupy a smaller portion of the video frame.

In another embodiment, operation 24 may determine the ratio of the user 5A in the video frame by using video/image analysis of the video stream. For example, operation 24 may use facial recognition algorithms to determine the position of the user 5A in a frame of the video stream and consequently determine the amount of the frame occupied by the user 5A. The facial recognition techniques may extract landmarks, or features, from the face of the user 5A represented in a frame of the captured video stream. For example, an algorithm may analyze the relative position, size, and/or shape of the eyes, nose, cheekbones, and jaw of the user 5A. These features are then used to determine the amount of the frame occupied by the user 5A. Either a geometric approach (i.e., feature oriented) or a photometric approach (i.e., statistics oriented) may be used for facial recognition and determining the ratio of the user 5A in the video frame. For example, one or more of Principal Component Analysis, Linear Discriminate Analysis, Elastic Bunch Graph Matching, and Multilinear Subspace Learning may be used at operation 24.

In one embodiment, this video/image analysis may be performed by the system 2. In this embodiment, the ratio of the user 5A in the video frame may be transmitted with the audio stream to the system 3 such that the audio stream may be processed according to the determined ratio, as will be described in further details below. In another embodiment, the system 2 may process the audio stream based on the determined ratio prior to transmitting the audio stream to the system 3.

Following the determination of the position of the near-end user 5A in a frame of the video stream, the method 22 may move to operation 25 to generate a set of target audio parameters for the audio stream based on the determined ratio of the user 5A in a frame of the video stream. In one embodiment, the set of target audio parameters may include parameters for adjusting 1) the directivity of one or more beams produced by the audio stream; 2) a loudness parameter for sound produced by the audio stream; 3) a reverberation level for sound produced by the audio stream; and/or 4) equalization settings for sound produced by the audio stream. As noted above, each of these parameters may be computed by the system 2 and transmitted to the far-end system 3 along with the audio and video streams over the data connection 6. In this embodiment, the system 3 may apply the target audio parameters such that sound produced by the audio stream more closely reflects the orientation and positioning of the user 5A. In another embodiment, the set of target audio parameters may be applied by the system 2 before transmission of the audio stream over the data connection 6 to the system 3. In this fashion, the system 3 plays the audio stream without further processing. In still another embodiment, the system 3 may perform operation 25 to determine the target audio parameters based on the determined ratio of the user 5A in a frame of the video stream. Accordingly, processing of the audio stream using the set of target audio parameters is also performed by the far-end system 3.

Figure 8:
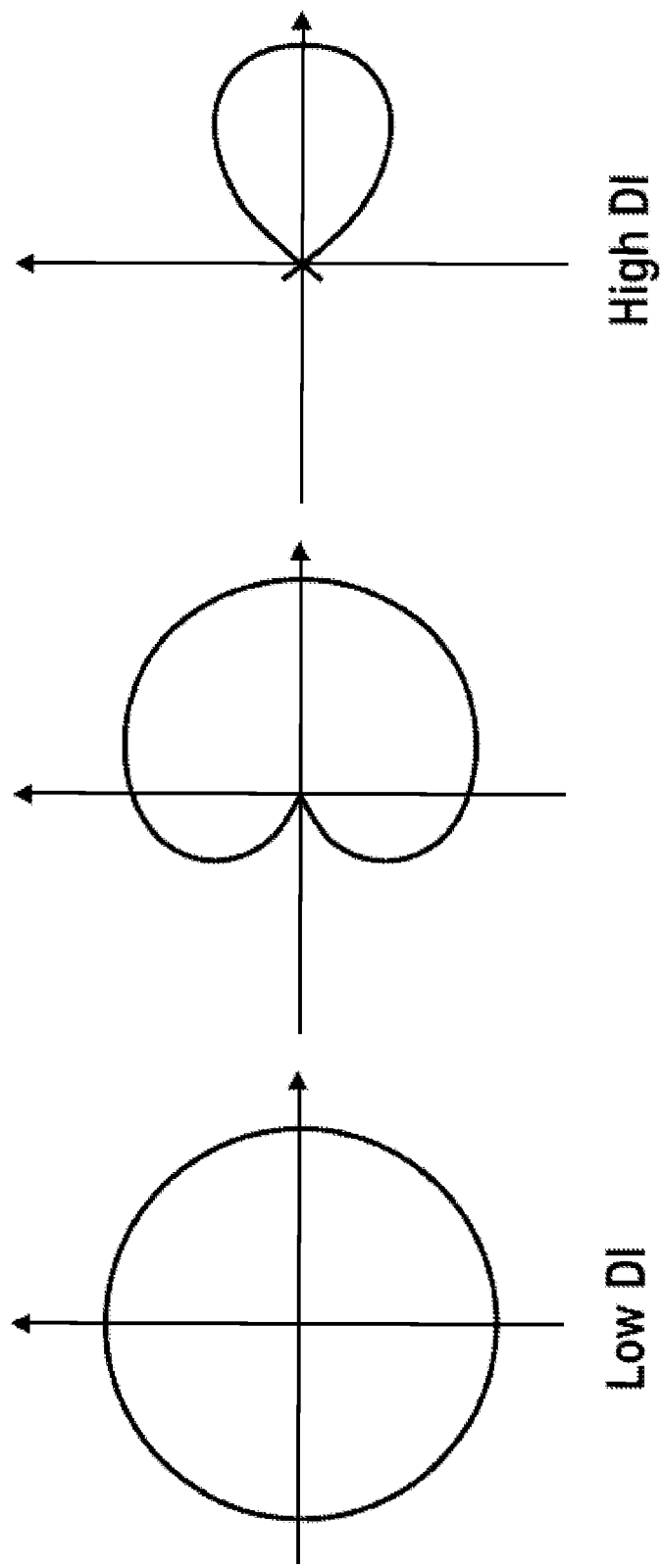
FIG. 8 shows various beam patterns with varied directivity indexes according to one embodiment of the invention.

As noted above, the set of target audio parameters generated at operation 25 may include a directivity setting for one or more beams generated by the audio stream. For example, the directivity setting may indicate a directivity index for a beam produced by the audio stream. The directivity index describes the amount of direct sound energy emitted on axis toward a listener (e.g., the user 5B) compared to the amount of sound energy emitted off axis from the listener (i.e., emitted generally into the second location 4B). FIG. 8 shows various beam patterns with varied directivity indexes. In this example, the directivity indexes of the beam patterns increase from left to right.

In one embodiment, when it is determined at operation 24 that the user 5A is positioned to occupy a large amount of a frame of the video stream, the directivity index may be set to a higher value than when operation 24 determines that the user 5A is positioned to occupy a smaller amount of a frame of the video stream. For example, when the user 5A occupies 40% of a frame of the video stream the directivity index for a beam pattern of the audio stream may be set to four decibels (4 dB) at operation 25, while when the user 5A occupies 90% of a frame of the video stream the directivity index for a beam pattern of the audio stream may be set to eight decibels (8 dB) at operation 25. In this fashion, a more direct sound is provided to the user 5B when the user 5A is occupying a greater amount of a frame of the video stream. This more direct sound imitates the more intimate speaking style the user 5A is likely intending by siting close to the video camera or zooming in such that the video frame is largely occupied by the user 5A.

In one embodiment, the directivity index may be set based on preset ranges. For example, the table below may be used to set the directivity index based on the percentage of a video frame occupied by the user 5A.

| % of Frame Occupied | Directivity Index |
| --- | --- |
| 1%-20% | 0 dB |
| 21%-40% | 2 dB |
| 41%-60% | 4 dB |
| 61%-80% | 6 dB |
| 81%-90% | 8 dB |
| 91%-100% | 10 dB |

In other embodiments, different ranges and corresponding directivity indexes may be used at operation 25 than the ones shown and described above.

As noted above, the set of target audio parameters generated at operation 25 may include a loudness parameter for sound generated by the audio stream. The loudness may be adjusted based on the position of the user 5A in the video stream. In one embodiment, when the user 5A occupies a large amount of a frame of the video stream, the loudness of sound generated by the audio stream may be set at a higher level than when the user 5A occupies a smaller amount of a frame of the video stream. For example, when the user 5A occupies 40% of a frame of the video stream the loudness of the audio stream may be increased by six decibels (6 dB), while when the user 5A occupies 90% of a frame of the video stream the loudness of the audio stream may be decreased by six decibels (6 dB). In this fashion, the audio stream is louder when the user 5A is occupying a greater amount of the frame of the video stream. This louder sound imitates the user 5A being closer and speaking directly to the user 5B. In contrast, when the user 5A occupies a lower percentage of a frame of the video stream, sound is played at a lower level to imitate that the user 5A is father away.

In one embodiment, the loudness of the audio stream may be set based on preset ranges. For example, the table below may be used to set the loudness based on the percentage of a frame occupied by the user 5A.

| % of Frame Occupied | Loudness |
| --- | --- |
| 1%-20% | −4 dB |
| 21%-40% | −2 dB |
| 41%-60% | 0 dB |
| 61%-80% | 2 dB |
| 81%-90% | 4 dB |
| 91%-100% | 6 dB |

In other embodiments, different ranges and corresponding loudness levels may be used at operation 25 than the ones shown and described above.

As noted above, the set of target audio parameters generated at operation 25 may include equalization settings for sound generated by the audio stream. The equalization settings may alter the frequency response of the audio stream using one or more linear filters. In one embodiment, when it is determined at operation 24 that the user 5A is positioned to occupy a small amount of a frame of the video stream, the equalization parameters may be set to low pass filter the audio stream. Generally, rooms are more absorptive at high frequencies. Accordingly, if a speaker or sound source is father away, fewer high frequency sounds will be heard. When the user 5A occupies a small amount of a video frame, it can be assumed that the user 5A is farther away from the video camera 11A. By filtering out the high frequency sounds, the produced sound imitates the user 5A being far away (i.e., occupying a small amount of the video frame).

In one embodiment, the level and type of filtering may be adjusted based on the amount of the video frame occupied by the user 5A. For example, a family of low frequency shelves or slopes with varying steepness may be selected to process the audio stream based on the amount of the video frame occupied by the user 5A.

As noted above, the set of target audio parameters generated at operation 25 may include a reverberation parameter for sound generated by the audio stream. The reverberation parameter defines a loudness level of reverberant sound generated by the audio stream. As shown in FIG. 6A, the system 2 may utilize a first set of microphones and beams (e.g., the left and right beam patterns 30 and 32) to sense reverberant sounds in the first location 4A and a second set of microphones and beams (e.g., the center beam pattern 31) to sense direct sounds in the first location 4A. In this embodiment, both sets of sensed sounds and beams may be transmitted to the system 3 in the audio stream (e.g., transmitted as separate channels). When operation 24 determines that the user 5A occupies a small area of a video frame, the loudness of these reverberant sounds may be set to a high level. In contrast, when operation 24 determines that the user 5A occupies a large area of a video frame, the loudness of these reverberant sounds may be set to a low level. For example, when the user 5A occupies 40% of a frame of the video stream the loudness of reverberant sound may be increased by six decibels (6 dB), while when the user 5A occupies 90% of a frame of the video stream the loudness of the reverberant sound may be decreased by six decibels (6 dB). In this fashion the reverberant sound is softer when the user 5A is occupying a greater amount of the frame of the video stream. This lower level of reverberant sounds imitates the user 5A being closer and speaking directly to the user 5B without the effects of a reverberant room. In contrast, when the user 5A occupies a lower percentage of a frame of the video stream, louder reverberant sounds imitates the user 5A situated farther from video camera 11A and the resulting effects of a reverberant room.

In one embodiment, the loudness of the reverberant sounds may be set based on preset ranges. For example, the table below may be used to set the loudness of reverberant sounds based on the percentage of the frame occupied by the user 5A.

| % of Frame Occupied | Loudness |
|---|---|
| 1%-20% | 4 dB |
| 21%-40% | 2 dB |
| 41%-60% | 0 dB |
| 61%-80% | −2 dB |
| 81%-90% | −4 dB |
| 91%-100% | −6 dB |

In other embodiments, different ranges and corresponding loudness levels may be used at operation 25 for reverberant sound than the ones shown and described above.

As described above, operation 25 generates a set of target audio parameters for modifying the audio stream. The set of target audio parameters are generated such that the amount of area of a video frame occupied by the user 5A may be simulated when the audio stream is played by the system 3. In one embodiment, operation 26 generates a set of intermediary parameters between the current set of audio parameters being utilized by the system 3 and the set of target audio parameters generated at operation 25. The current set of audio parameters may have been previously set by the method 22 (i.e., previous target audio parameters) or may be default settings of the video conferencing system 1. The intermediary audio parameters create a smooth transition between the current set of audio parameters and the set of target audio parameters generated at operation 25.

Figure 9B:
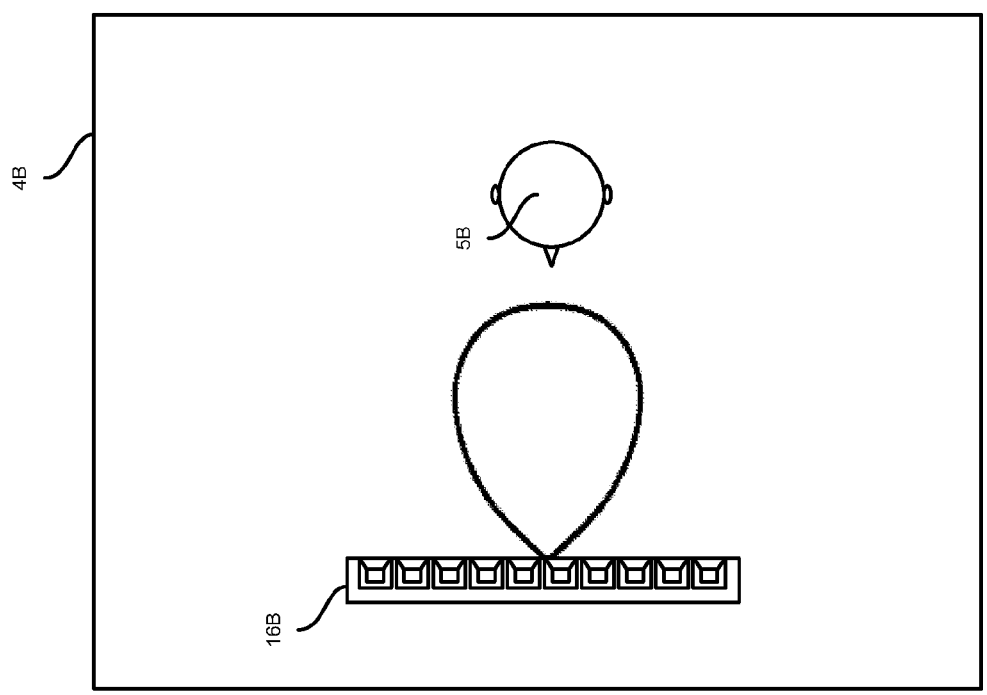
FIG. 9B shows a second directivity pattern during a transition to a target directivity pattern according to one embodiment of the invention.
Figure 10:
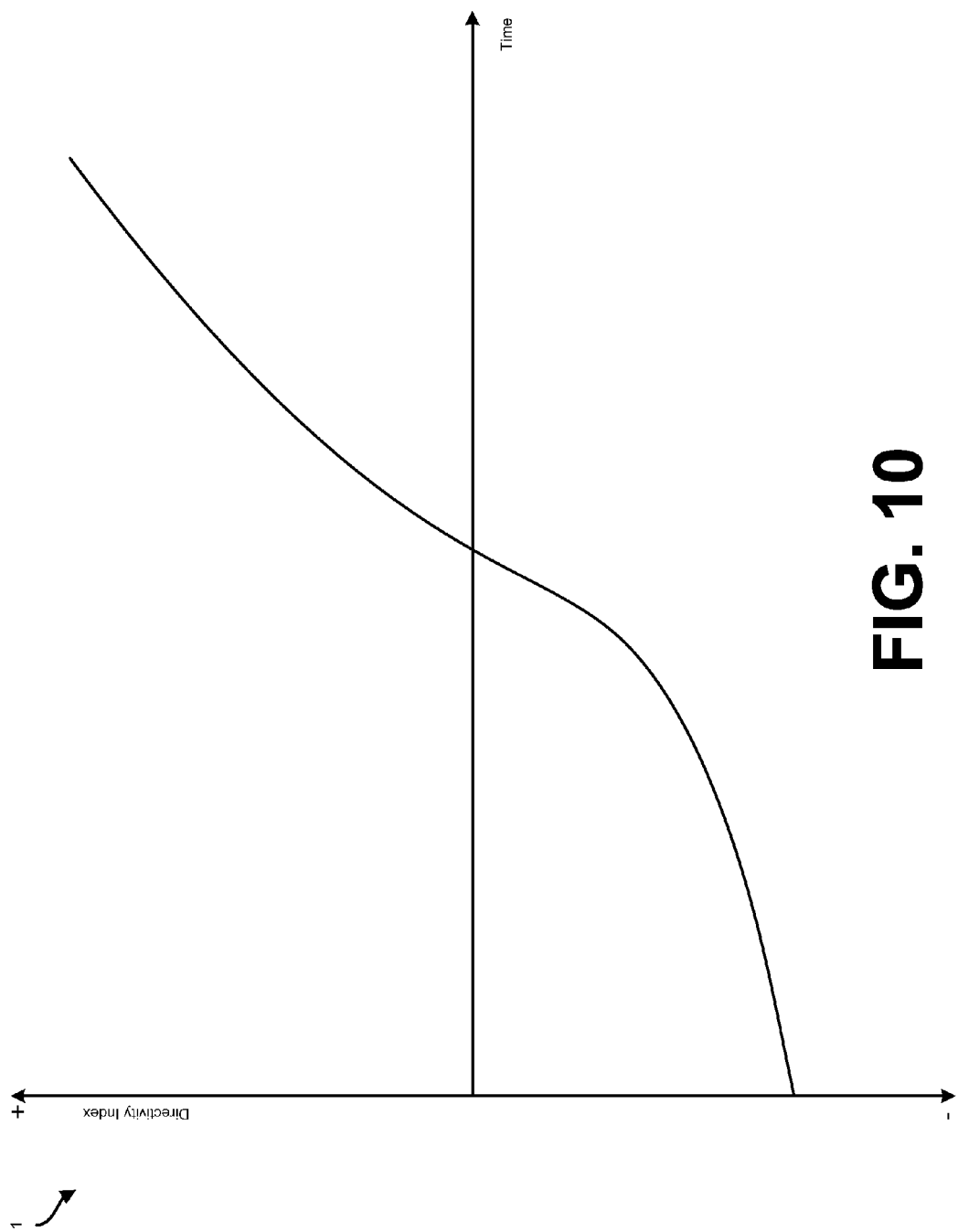
FIG. 10 shows an example curve that may be used to generate one or more intermediary directivity index transition points according to one embodiment of the invention.

In one example, the current audio parameters may indicate that a beam pattern generated by the audio stream has a directivity index of 2 dB. In contrast, the set of target audio parameters generated at operation 25 may indicate a directivity index for the beam pattern of 8 dB. To make this transition from 2 dB to 8 dB, operation 26 may generate one or more intermediary audio parameters that allow the beam pattern to slowly and smoothly converge to 8 dB. For example, the intermediary audio parameters may include a first intermediary directivity index of 4 dB and a second intermediary directivity index of 6 dB. When processed in succession (e.g., 2 dB to 4 dB, 4 dB to 6 dB, and 6 dB to 8 dB) as shown in FIGS. 9A-9C, a smooth beam transition is perceived by the user 5B. In one embodiment, a present curve or formula for determining directivity index intermediary points may be used. For example, FIG. 10 shows an example curve that may be used to generate one or more intermediary directivity index transition points at operation 26.

Intermediary audio parameters may be generated for other audio parameters for the set of target audio parameters in a similar fashion as described above in relation to generation of intermediary audio parameters for a directivity index. For example, intermediary audio parameters may be generated for 1) a loudness parameter for direct sounds produced by the audio stream; 2) a loudness level for reverberant sounds produced by the audio stream; and 3) equalization settings for sound produced by the audio stream. These intermediary audio parameters provide a smoother transition between the current audio settings and the set of target audio settings generated at operation 25 to mimic the area of a video frame occupied the user 5A.

Following the generation of target audio parameters at operation 25 and intermediate audio parameters at operation 26, operation 27 may process the audio stream to output audio through the speaker array 18B based on these sets of audio parameters. As noted above, the audio parameters generated at operations 25 and 26 may be transmitted to the system 3 for processing of the audio stream. In this embodiment, the sets of audio parameters may be submitted in a separate data stream and/or as metadata for the audio stream. In another embodiment, the audio stream may be processed by the system 2 using these audio parameters before transmission of the audio stream to the system 3. In still another embodiment, the system 3 may perform operations 25 and 26 to generate the sets of audio parameters after receipt of the audio stream and the video stream. In this embodiment, the system 3 processes the audio stream using the generated audio parameters at operation 27.

By analyzing video frames associated with an audio stream, the video conferencing system 1 may drive the speaker array 18B to more accurately reproduce sound content based on the position of a user in one or more video frames. In particular, the adjusted audio imitates the intimacy or social characteristics of the recorded user's speech. For example, the audio may be adjusted to reproduce effects of a room when the recorded user occupies a relatively small amount of a video frame while these room effects are lessened or eliminated when the recorded user occupies a large amount of the video frame.

As explained above, an embodiment of the invention may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

What is claimed is:

1. A method for adjusting sound emitted by a far-end system, comprising:
    receiving, by the far-end system, a video stream and an audio stream captured by a near-end system;
    determining an amount of area in a first frame of the video stream occupied by a near-end audio source;
    determining a first set of audio parameters to apply to the audio stream based on the determined amount of area in the first frame of the video stream occupied by the near-end audio source; and
    playing the audio stream using the first set of audio parameters to emit sound through one or more transducers in a speaker system of the far-end system.

2. The method of claim 1, wherein the near-end audio source is a user of the near-end system captured by a near-end video camera.

3. The method of claim 1, wherein determining the amount of area in the first frame occupied by the near-end audio source is determined based on one of (1) a zoom setting of a near-end video camera that captured the first frame and (2) an analysis of the first frame using facial recognition.

4. The method of claim 1, wherein determining the first set of audio parameters comprises:
    setting a loudness parameter to a first loudness level for the sound produced by the speaker system in the far-end system while playing the audio stream upon determining that the near-end audio source occupies more than a predefined amount of the first frame; and
    setting the loudness parameter to a second loudness level for the sound produced by the speaker system in the far-end system while playing the audio stream upon determining that the near-end audio source occupies less than the predefined amount of the first frame, wherein the first loudness level is larger than the second loudness level.

5. The method of claim 1, wherein determining the first set of audio parameters comprises:
    setting a directivity parameter for sound produced by the speaker system in the far-end system while playing the audio stream to a first directivity level upon determining that the near-end audio source occupies more than a predefined amount of the first frame; and
    setting the directivity parameter for sound produced by the speaker system in the far-end system while playing the audio stream to a second directivity level upon determining that the near-end audio source occupies less than the predefined amount of the first frame, wherein the first directivity level is greater than the second directivity level.

6. The method of claim 1, wherein determining the first set of audio parameters comprises:
    setting an equalization parameter for sound produced by the speaker system in the far-end system while playing the audio stream to a first equalization setting upon determining that the near-end audio source occupies more than a predefined amount of the first frame; and
    setting the equalization parameter for sound produced by the speaker system in the far-end system while playing the audio stream to a second equalization setting upon determining that the near-end audio source occupies less than the predefined amount of the first frame, wherein the first equalization setting filters more high frequency elements of the audio stream than the second equalization setting.

7. The method of claim 1, wherein determining the first set of audio parameters comprises:
    setting a reverberation parameter for sound produced by the speaker system in the far-end system while playing the audio stream to a first reverberation level upon determining that the near-end audio source occupies more than a predefined amount of the first frame; and
    setting the reverberation parameter for sound produced by the speaker system in the far-end system while playing the audio stream to a second reverberation level upon determining that the near-end audio source occupies less than the predefined amount of the first frame, wherein the first reverberation level is less than the second reverberation level.

8. The method of claim 7, wherein playing the audio stream using the first set of audio parameters, including the reverberation parameter, comprises:
    detecting separately by one or more microphones in the near-end system (1) reverberant sounds and (2) direct sounds produced by the near-end audio source, wherein the audio stream includes both the reverberant sounds and direct sounds from the near-end audio source; and
    driving the speaker system in the far-end system to emit the reverberant sounds off axis from the direct sounds, wherein the reverberation parameter represents a loudness of reverberant sounds.

9. The method of claim 8, wherein the one or more microphones vary widths or directions of one or more associated beam patterns over time to capture the reverberant sounds and the direct sounds.

10. The method of claim 1, further comprising:
    determining an amount of area in a second frame of the video stream occupied by the near-end audio source;
    determining a second set of audio parameters to apply to the audio stream based on the determined amount of area in the second frame of the video stream occupied by the near-end audio source;
    determining one or more intermediary audio parameters between the first set of audio parameters and the second set of audio parameters; and
    playing the audio stream to emit sound through the speaker system of the far-end system sequentially using the first set of audio parameters, the one or more intermediate audio parameters, and the second set of audio parameters.

11. An article of manufacture, comprising:
    a non-transitory machine-readable storage medium that stores instructions which, when executed by a processor in a computer,
        determine an amount of area in a first frame of a video stream occupied by a near-end audio source, wherein the video stream is captured by a near-end system along with a corresponding audio stream;
        determine a first set of audio parameters to apply to the audio stream based on the determined amount of area in the first frame of the video stream occupied by the near-end audio source; and play the audio stream using the first set of audio parameters to emit sound through one or more transducers in a speaker system of a far-end system.

12. The article of manufacture of claim 11, wherein determining the amount of area in the first frame occupied by the near-end audio source is determined based on one of (1) a zoom setting of a near-end video camera that captured the first frame and (2) an analysis of the first frame using facial recognition.

13. The article of manufacture of claim 11, wherein the non-transitory machine-readable storage medium stores further instructions which, when executed by the processor:
   set a loudness parameter to a first loudness level for the sound produced by the speaker system in the far-end system while playing the audio stream upon determining that the near-end audio source occupies more than a predefined amount of the first frame; and
   set the loudness parameter to a second loudness level for the sound produced by the speaker system in the far-end system while playing the audio stream upon determining that the near-end audio source occupies less than the predefined amount of the first frame, wherein the first loudness level is larger than the second loudness level.

14. The article of manufacture of claim 11, wherein the non-transitory machine-readable storage medium stores further instructions which, when executed by the processor:
   set a directivity parameter for sound produced by the speaker system in the far-end system while playing the audio stream to a first directivity level upon determining that the near-end audio source occupies more than a predefined amount of the first frame; and
   set the directivity parameter for sound produced by the speaker system in the far-end system while playing the audio stream to a second directivity level upon determining that the near-end audio source occupies less than the predefined amount of the first frame, wherein the first directivity level is greater than the second directivity level.

15. The article of manufacture of claim 11, wherein the non-transitory machine-readable storage medium stores further instructions which, when executed by the processor:
   set a reverberation parameter for sound produced by the speaker system in the far-end system while playing the audio stream to a first reverberation level upon determining that the near-end audio source occupies more than a predefined amount of the first frame; and
   set the reverberation parameter for sound produced by the speaker system in the far-end system while playing the audio stream to a second reverberation level upon determining that the near-end audio source occupies less than the predefined amount of the first frame, wherein the first reverberation level is less than the second reverberation level.

16. The article of manufacture of claim 11, wherein the non-transitory machine-readable storage medium stores further instructions which, when executed by the processor:
   set an equalization parameter for sound produced by the speaker system in the far-end system while playing the audio stream to a first equalization setting upon determining that the near-end audio source occupies more than a predefined amount of the first frame; and
   set the equalization parameter for sound produced by the speaker system in the far-end system while playing the audio stream to a second equalization setting upon determining that the near-end audio source occupies less than the predefined amount of the first frame, wherein the first equalization setting filters more high frequency elements of the audio stream than the second equalization setting.

17. The article of manufacture of claim 11, wherein the non-transitory machine-readable storage medium stores further instructions which, when executed by the processor:
   determine an amount of area in a second frame of the video stream occupied by the near-end audio source;
   determine a second set of audio parameters to apply to the audio stream based on the determined amount of area in the second frame of the video stream occupied by the near-end audio source;
   determine one or more intermediary audio parameters between the first set of audio parameters and the second set of audio parameters; and
   play the audio stream to emit sound through the speaker system of the far-end system sequentially using the first set of audio parameters, the one or more intermediate audio parameters, and the second set of audio parameters.

18. A far-end system for adjusting audio, comprising:
   a network interface for receiving an audio stream and a video stream captured by a near-end system; and
   a hardware processor to:
      determine a first set of audio parameters to apply to the audio stream based on a determined amount of area in a first frame of the video stream occupied by a near-end audio source; and
      play the audio stream using the first set of audio parameters to emit sound through one or more transducers in a speaker system of the far-end system.

19. The far-end system of claim 18, wherein the hardware processor further:
   determines the amount of area in the first frame of the video stream occupied by the near-end audio source.

20. The far-end system of claim 18, wherein determining the amount of area in the first frame occupied by the near-end audio source is determined based on one of (1) a zoom setting of a near-end video camera that captured the first frame and (2) an analysis of the first frame using facial recognition.

21. The far-end system of claim 18, wherein determining the first set of audio parameters comprises:
   setting a loudness parameter to a first loudness level for the sound produced by the speaker system in the far-end system while playing the audio stream upon determining that the near-end audio source occupies more than a predefined amount of the first frame; and
   setting the loudness parameter to a second loudness level for the sound produced by the speaker system in the far-end system while playing the audio stream upon determining that the near-end audio source occupies less than the predefined amount of the first frame, wherein the first loudness level is larger than the second loudness level.

22. The far-end system of claim 18, wherein determining the first set of audio parameters comprises:
   setting a directivity parameter for sound produced by the speaker system in the far-end system while playing the audio stream to a first directivity level upon determining that the near-end audio source occupies more than a predefined amount of the first frame; and
   setting the directivity parameter for sound produced by the speaker system in the far-end system while playing the audio stream to a second directivity level upon determining that the near-end audio source occupies less than the predefined amount of the first frame, wherein the first directivity level is greater than the second directivity level.

23. The far-end system of claim 18, wherein determining the first set of audio parameters comprises:
setting a reverberation parameter for sound produced by the speaker system in the far-end system while playing the audio stream to a first reverberation level upon determining that the near-end audio source occupies more than a predefined amount of the first frame; and
setting the reverberation parameter for sound produced by the speaker system in the far-end system while playing the audio stream to a second reverberation level upon determining that the near-end audio source occupies less than the predefined amount of the first frame, wherein the first reverberation level is less than the second reverberation level.

24. The far-end system of claim 18, wherein determining the first set of audio parameters comprises:
setting an equalization parameter for sound produced by the speaker system in the far-end system while playing the audio stream to a first equalization setting upon determining that the near-end audio source occupies more than a predefined amount of the first frame; and
setting the equalization parameter for sound produced by the speaker system in the far-end system while playing the audio stream to a second equalization setting upon determining that the near-end audio source occupies less than the predefined amount of the first frame, wherein the first equalization setting filters more high frequency elements of the audio stream than the second equalization setting.

* * * * *